US012664568B2

(12) United States Patent
Chen et al.

(10) Patent No.: US 12,664,568 B2
(45) Date of Patent: Jun. 23, 2026

(54) EMAIL SUBJECT LINE GENERATION METHOD

(71) Applicant: Constant Contact, Inc., Waltham, MA (US)

(72) Inventors: Ming Chen, Waltham, MA (US); Long Sha, Waltham, MA (US); Zhong Chen, Waltham, MA (US)

(73) Assignee: Constant Contact Inc., Waltham, MA (US)

( * ) Notice: Subject to any disclaimer, the term of this patent is extended or adjusted under 35 U.S.C. 154(b) by 0 days.

(21) Appl. No.: 19/090,894

(22) Filed: Mar. 26, 2025

(65) Prior Publication Data

US 2025/0225553 A1      Jul. 10, 2025

Related U.S. Application Data

(63) Continuation of application No. 17/855,625, filed on Jun. 30, 2022, now Pat. No. 12,282,941.

(51) Int. Cl.
| | |
|---|---|
| *G06Q 30/0241* | (2023.01) |
| *G06F 40/166* | (2020.01) |
| *G06F 40/295* | (2020.01) |
| *G06V 30/10* | (2022.01) |

(52) U.S. Cl.
CPC ....... *G06Q 30/0277* (2013.01); *G06F 40/166* (2020.01); *G06F 40/295* (2020.01); *G06V 30/10* (2022.01)

(58) Field of Classification Search
None
See application file for complete search history.

(56) References Cited

U.S. PATENT DOCUMENTS

| | | | |
|---|---|---|---|
| 7,752,074 | B2 | 7/2010 | Bosarge et al. |
| 7,761,524 | B2 | 7/2010 | Carmel et al. |
| 7,865,394 | B1 | 1/2011 | Calloway et al. |
| 7,962,850 | B2 | 6/2011 | Haynes et al. |
| 7,974,874 | B2 | 7/2011 | Bosarge et al. |
| 8,301,705 | B2 | 10/2012 | Wagner et al. |
| 8,327,264 | B2 | 12/2012 | Wagner et al. |
| 8,346,608 | B2 | 1/2013 | Bosarge et al. |
| 8,645,430 | B2 | 2/2014 | Khouri et al. |
| 8,661,351 | B2 | 2/2014 | DeLuca et al. |
| 9,092,742 | B1 | 7/2015 | Zeng et al. |

(Continued)

OTHER PUBLICATIONS

US 8,265,997 B2, 09/2012, Donovan (withdrawn)

(Continued)

*Primary Examiner* — Christopher B Tokarczyk
(74) *Attorney, Agent, or Firm* — Nieves IP Law Group, LLC; Peter A. Nieves

(57) ABSTRACT

A computer based method for an electronic marketing campaign from a customer to a contact receives a campaign having an email message body and a historic profile of a previous campaign by the customer. The email message body includes text and image data. The email message body is preprocessed based upon the campaign and the historic profile to produce campaign training data. A neural network learning model is trained with the campaign training data. The neural network provides a subject line recommendation inference, and named entity recognition is performed on the subject line recommendation.

19 Claims, 5 Drawing Sheets

(56)                    References Cited

U.S. PATENT DOCUMENTS

| | | | |
|---|---|---|---|
| 9,282,066 | B2 | 3/2016 | Chakra et al. |
| 9,306,878 | B2 | 4/2016 | Patil |
| 9,317,816 | B2 | 4/2016 | Zeng et al. |
| 9,319,367 | B2 | 4/2016 | Zeng et al. |
| 9,356,889 | B2 | 5/2016 | Caskey et al. |
| 9,582,571 | B2 | 2/2017 | Chakra et al. |
| 9,691,090 | B1 | 6/2017 | Barday |
| 9,742,718 | B2 | 8/2017 | Zeng et al. |
| 9,749,267 | B2 | 8/2017 | Patil |
| 9,892,441 | B2 | 2/2018 | Barday |
| 10,068,008 | B2 | 9/2018 | Udupa et al. |
| 10,204,084 | B2 | 2/2019 | Qadir et al. |
| 10,263,921 | B2 | 4/2019 | Celia |
| 10,303,720 | B2 | 5/2019 | Kirk et al. |
| 10,469,420 | B2 | 11/2019 | Carlen |
| 10,528,987 | B2 | 1/2020 | Soni et al. |
| 10,534,848 | B2 | 1/2020 | Qadir et al. |
| 10,601,739 | B2 | 3/2020 | Patil |
| 10,673,794 | B2 | 6/2020 | Knudson et al. |
| 10,778,620 | B1 | 9/2020 | Beeman et al. |
| 10,929,469 | B2 | 2/2021 | Kirk et al. |
| 11,159,467 | B2 | 10/2021 | Kwatra et al. |
| 11,184,450 | B2 | 11/2021 | Gagnon-Kvale et al. |
| 2007/0022170 | A1* | 1/2007 | Foulger .................. G06Q 30/02 |
| | | | 709/206 |
| 2007/0250576 | A1 | 10/2007 | Kumar et al. |
| 2008/0131006 | A1 | 6/2008 | Oliver |
| 2010/0250477 | A1 | 9/2010 | Yadav |
| 2011/0154221 | A1 | 6/2011 | DeLuca et al. |
| 2012/0084645 | A1 | 4/2012 | Haynes et al. |
| 2015/0058426 | A1* | 2/2015 | Caskey ................... H04L 51/02 |
| | | | 709/206 |
| 2015/0100416 | A1 | 4/2015 | Blackhurst et al. |
| 2015/0347925 | A1* | 12/2015 | Zeng ................. G06Q 30/0242 |
| | | | 709/206 |
| 2015/0348127 | A1 | 12/2015 | Zeng et al. |
| 2017/0083533 | A1 | 3/2017 | Chakra et al. |
| 2018/0176163 | A1 | 6/2018 | Arquero et al. |
| 2019/0171693 | A1 | 6/2019 | Dotan-Cohen et al. |
| 2019/0236621 | A1 | 8/2019 | Liu et al. |
| 2020/0374247 | A1 | 11/2020 | Beeman et al. |
| 2021/0133287 | A1* | 5/2021 | Ayloo ................. G06Q 10/107 |
| 2021/0157974 | A1 | 5/2021 | Xie et al. |
| 2021/0294978 | A1* | 9/2021 | Chhaya ................... G06N 3/09 |
| 2022/0035989 | A1 | 2/2022 | Dotan-Cohen et al. |
| 2022/0060552 | A1 | 2/2022 | Gagnon-Kvale et al. |
| 2023/0268026 | A1* | 8/2023 | Spreafico ............... G16B 20/20 |
| | | | 702/19 |

OTHER PUBLICATIONS

Xue et al. ("Key Factors of Email Subject Generation." In: Yang, H., Pasupa, K., Leung, A.CS., Kwok, J.T., Chan, J.H., King, I. (eds) Neural Information Processing. ICONIP 2020. Communications in Computer and Information Science, vol. 1332, pp. 668-675, 2020) (Year: 2020).*

* cited by examiner

Receive customer historical campaigns
710

Receive customer historical campaign metrics
715

Select a subset of star campaigns from the historical campaigns
720

Quality Check
730

Separate the star campaign data set into finer categories
740

EMAIL SUBJECT LINE GENERATION METHOD

CROSS-REFERENCE TO RELATED APPLICATIONS

This application claims the benefit of and is a continuation of U.S. application Ser. No. 17/855,625 filed Jun. 30, 2022, entitled "EMAIL SUBJECT LINE GENERATION METHOD," of which is incorporated by reference herein in their entirety.

FIELD OF THE INVENTION

The present invention relates to automated generation of a summary based on text data, and more particularly, is related to generating an email subject line based on the content of the body of an email message.

BACKGROUND OF THE INVENTION

Electronic marketing campaigns may include sending email to targeted recipients. As electronic marketing becomes more prevalent, recipients may decide whether or not to open an email based upon the email subject line. Further, recipients tend to spend very little time deciding whether to open or discard a received email. Subject lines are generally more effective when they are concise and focused, so they garner attention from the recipient. The author of an email may spend significant time composing a subject line. Previous automated solutions have focused solely on the textual content of the email body. Such solutions have typically been impersonal, and have not attracted appropriate attention of individual users. Therefore, there is a need in the industry to address the above-mentioned shortcomings.

SUMMARY OF THE INVENTION

Embodiments of the present invention provide a method and system for email subject line generation. Briefly described, the present invention is directed to a computer based method for an electronic marketing campaign from a customer to a contact. The campaign includes an email message body and a historic profile of a previous campaign by the customer. The email message body includes text and image data. The email message body is preprocessed based upon the campaign and the historic profile to produce campaign training data. A neural network learning model is trained with the campaign training data. The neural network provides a subject line recommendation inference, and named entity recognition is performed on the subject line recommendation.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
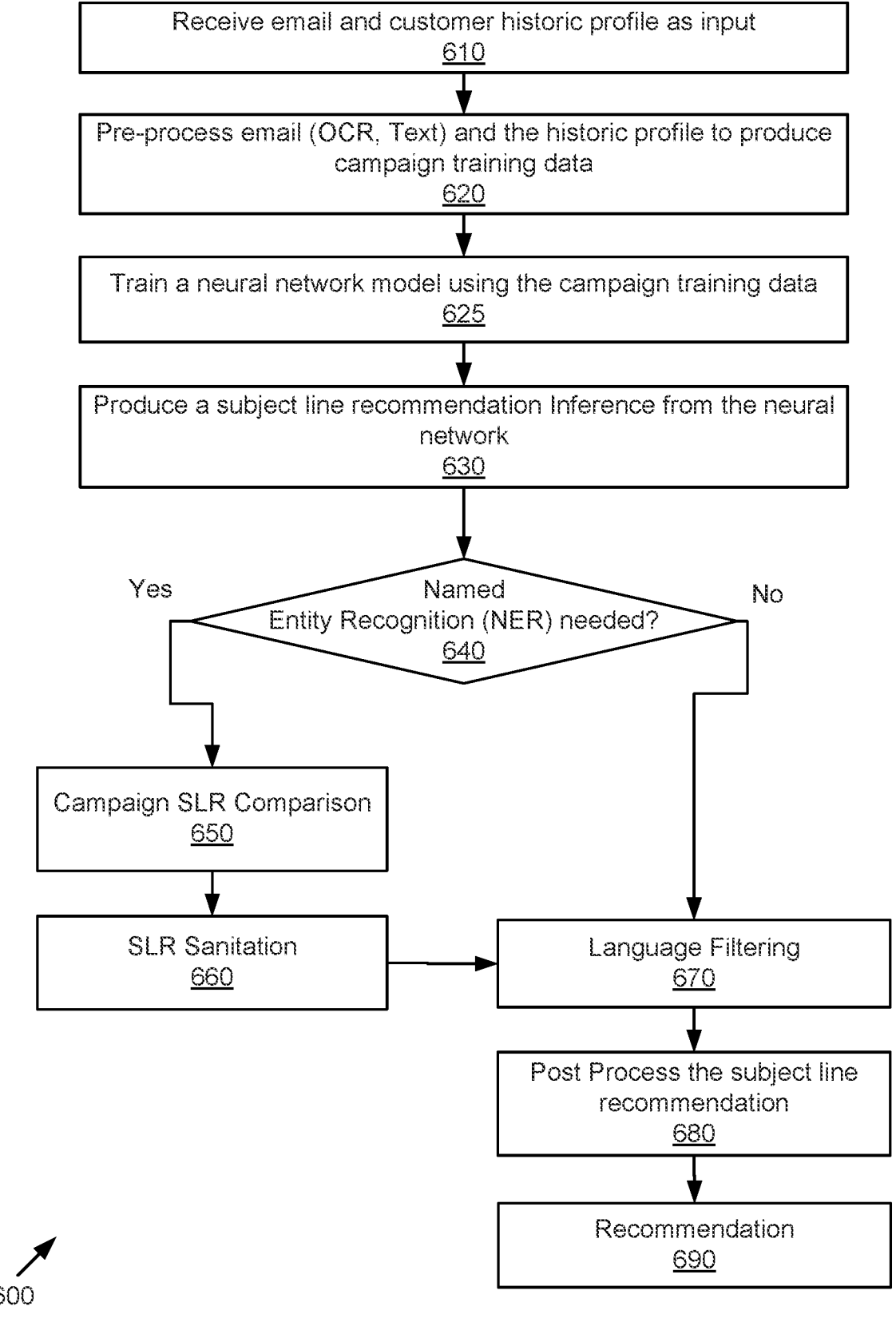
FIG. 1 is a flowchart of an exemplary embodiment of a method for generating subject line recommendations.

The following definitions are useful for interpreting terms applied to features of the embodiments disclosed herein, and are meant only to define elements within the disclosure.

As used within this disclosure, a "customer" refers to a user of the exemplary embodiments.

As used within this disclosure, a "contact" refers to the recipient of a communication from a customer.

As used within this disclosure, a "campaign" refers to a marketing email sent from a customer to a contact. A campaign may include several types of media, including, but not limited to text, audio data, video data, and still image data. The campaign may preferably be in a file format such as HTML, rich text, or plain text, however, other file structures may be used, for example, EDB, EML, or EMLX, or heap data structures, among others.

As used within this disclosure, a "star campaign" refers a customer campaign that has been deemed successful, for example, achieving a hit rate above a predetermined threshold.

As used within this disclosure, a "historic campaign profile" refers to one or more data files with the original content of all previous campaigns and customer action/inaction on those campaigns. For example, a historic campaign profiles may be processed automatically using data streaming process technology, for example, Amazon Web Services (AWS) Kinesis streaming process technology.

As used within this disclosure, "pre-processing" refers to the process of receiving a campaign, extracting text from the campaign media, and aggregating all of the extracted text segments.

As used within this disclosure, a "vertical" refers to a sector of a customer's business, for example, 'retail', 'non-profit', 'real estate,' among others. Verticals may be used in conjunction with other attributes of the business of the customer, for example, the size of the customer business, to train SLR models. For example, the top performing campaigns (e.g., high click-rate, high open-rate) for each vertical and business size may be selected for SLR model training.

As used within this disclosure, an "SLR Model" refers to a neural network deep learning model used in a process that receives a text input and produces subject line recommendation (SLR) as output, for example, a list of recommended subject lines.

As used within this disclosure, "SLR Model Training" refers to training of a neural network model, for example, a transformer based model, with a hyperparameter tuning module that selects an appropriate network layer size, depth, learning rate and optimization function. For example, the tuning module may draw from customer historical campaigns and tracked metrics regarding these campaigns, for example, but not limited to social media likes, open rates, click rates, among others. T5 is a known neural network model that trains on a mixture of unlabeled text and labeled data from natural language processing tasks, then fine-tuned individually for each task assigned to be solved.

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention are directed towards an email subject line generation methodology for campaigns from a customer directed toward a contact. Under a first exemplary embodiment, suggested email subject lines are automatically generated from analyzing current email context, prior campaign performance, and an historic profile for the customer. The method provides one or more subject line recommendations (SLR). The subject line recommendations generated to increase a likelihood of engagement of the contact upon receipt of the campaign email.

FIG. 1 is a flowchart of an exemplary method for generating subject line text for a customer campaign to a contact. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A campaign email message body and a customer historic profile is received, as shown by block 610. For example, the email may be an HTML file that includes text describing the customer benefits provided via the campaign, as well as attached, linked, and/or embedded media, for example, graphics (images and/or photographs), audio, and/or video. The text portion of the email message body may include one or more dynamic macros for example, used to fill in specific contact data during post-processing (see block 680 below), for example:

"Dear ['First Name'], please check out our new collection in person!"

Where after the dynamic macro is run, the customer's contact 'John' finally receives:

"Dear John, please check out our new collection in person!"

The customer historic profile includes a record of previous campaigns by the customer. For example, the customer historic profile may include all emails which have been sent to the contact and open/click data on those historic email campaigns. The historic profile data may include business essential information such as company vertical information (sector of market, e.g., 'real estate' or 'non-profit'), campaign sending behavior (frequency e.g., number of sending in the past three month; average open rate e.g., 0.7; average click rate e.g. 0.5), and list of top sent campaigns in the last three month (e.g. list campaigns in html format), amongst other data.

The campaign email message body may be generally complete, but lacking a subject line, or in some instances the customer has supplied an initial attempt at a subject line. The first embodiment provides subject line recommendations either in lieu of a customer supplied subject line, or as a candidate to replace a customer supplied subject line.

The campaign email message body is processed to produce campaign training data, for example, a plurality of text tokens, as shown by block 620. This may involve separately pre-processing the text content of the email body text, and extracting text from the embedded media, for example, using optical character recognition (OCR) such as LSTM (long short term memory) models, ResNet, DenseNet, ViT (Vision Transformer) Models, among others to extract text from still images and/or video image frames, and/or using speech-to-text recognition such as Wave2Vec, amongst others, to extract text from audio and/or video media. The following is an example of an exemplary campaign email message:

We look forward to welcoming you as our guest at [location] at [event location] on [date] and [event] at [event location]. Please see below for more details on these events. As part of our hospitality package, we would like to send you some [event] swag items in advance of the event.

If you'd like to receive a package, please email [contact info] with the mailing address you would like package sent to prior to the event.

If you are interested in staying in [location], we have reserved a block of rooms at [location]. The last day to book for the discounted rate is [date].

Please click here to reserve [link]. [event] on [date] will be at [venue]. Please click here for more information about [event].

On [date] enjoy [event], and [event details], an all inclusive venue located on the [location].

Additionally, guests will enjoy access to the pool patio featuring a large video screen, lounge seating, and bar service. Click here for more information about the [venue].

Information on parking and shuttle services will be provided prior to the [event]. If you have any questions, please don't hesitate to contact me. I look forward to seeing you at the event!

Figure 4:
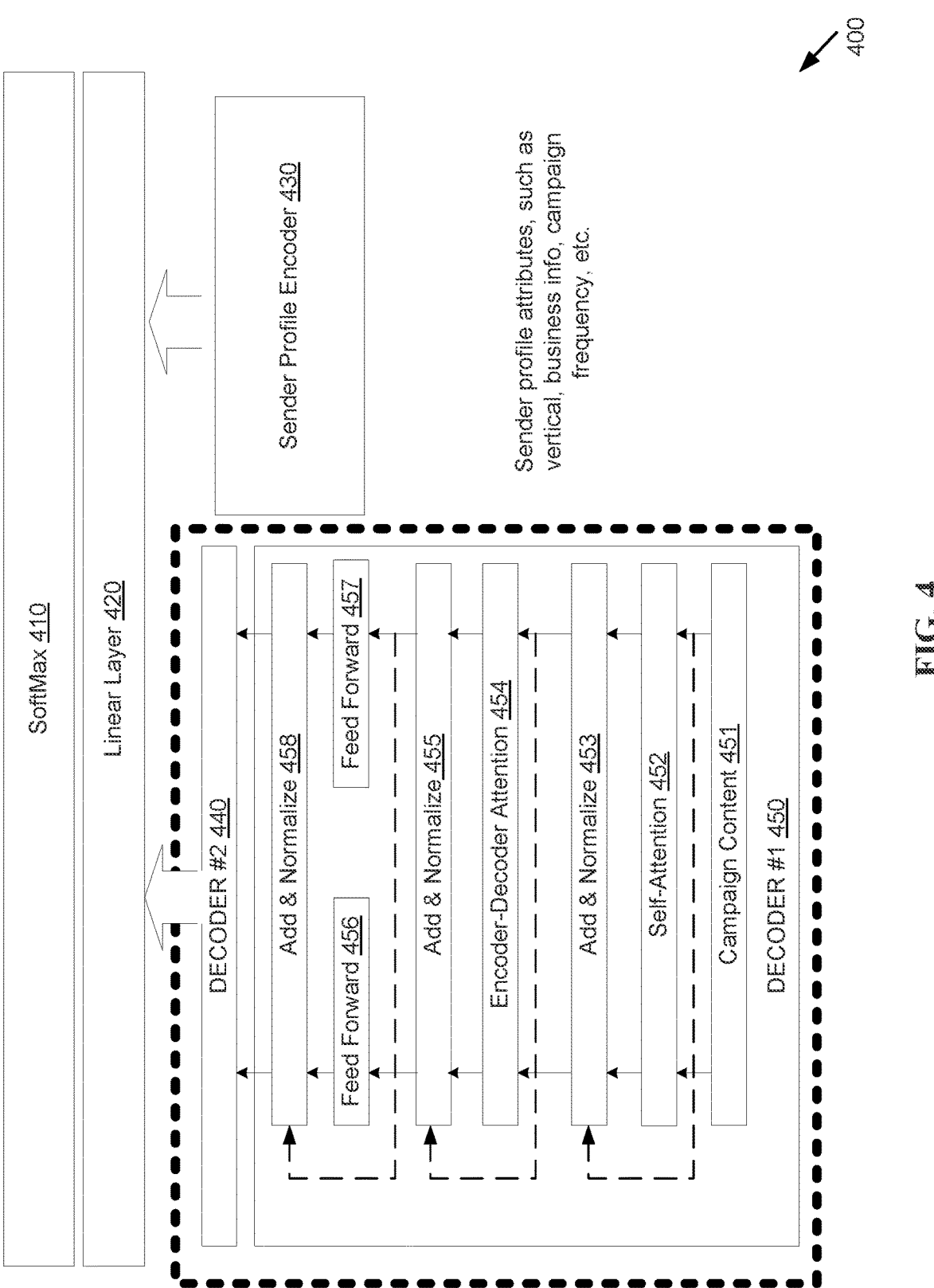
FIG. 4 is a block diagram illustrating an example of a modified T5 model under the first exemplary embodiment.

The campaign training data is used to train a deep learning neural network, for example, a modified T5 model 400, as shown by block 625, wherein the modified T5 model 400 includes an layer in addition to an original T5 model, as shown by FIG. 4. Decoder #1 450 and decoder #2 440 are part of the original T5 model. The first encoder 450 receives campaign content 451 as input, processed by a standard T5 processing blocks 452-458, as familiar to person having ordinary skill in the art. The second decoder 440 receives the output of the first decoder 450 as input. The output of the second decoder 440 is used as input by the T5 model linear layer 420. The present embodiment adds an extra sender profile encoder layer for 430 processing the sender (customer) profile and the linear layer 420 to fuse the content encoding and profile encoding together for model output generation. The sender profile encoder 430 may include as input customer business information, for example, company vertical information (sector of market), campaign sending behavior (frequency, etc.), top history campaigns (list of top ranked campaigns in HTML format). The output is a neural network layer output in the format of float number tensor. The output of the sender profile encoder layer 430 is used as input by the T5 model linear layer 420. A SoftMax process 410 applies a ranking to the output of the linear layer 420.

The neural network model produces a subject line recommendation, as shown by block 630. The subject line recommendation may be a single subject line, or the subject line recommendation may be a list of two or more subject lines for the customer to select from.

The method checks if named entity recognition (NER) is to be performed on the recommended subject lines, as shown by block 640. The NER looks for entity titles and terms that may be specific or unique to the customer and ensures the extracted text correctly reflects and expresses these terms in the context of a subject line recommendation. Examples of such name may include the customer name, a product name, an event name, or other terminology specific to the customer campaign. For example, for the subject line "Checkout our SummerFest at Constant Contact," the NER result may be {"event": 'SummerFest,' "organization": "Constant Contact"}. The NER is preferably based on transformer models (a deep neural network), for example, BERT (Bidirectional Encoder Representations from Transformers), or alternatively, traditional entity recognizer models such as spaCy may be used.

If there are inconsistencies between the campaign data and language in the subject line recommendation, SLR sanitation corrects the subject lines accordingly, as shown by block 660. Here, the SLR sanitation may correct spellings of terms in the subject line specific to the campaign. For example, after sanitation, the subject line "Check out our Summer Festival" may read "Checkout our Summerfest!"

Additional language filtering may be performed, as shown by block 670. For example, the recommended subject line may be scanned against a curated language blacklist, so inappropriate or undesirable words or phrases may be removed or replaced. Examples of such language may include innuendo, offensive language, profanity, or other language that may be considered problematic or otherwise likely to discourage a contact's engagement with the campaign.

Post-processing of the subject line recommendation, as shown by block 680, may include inserting and/or resolving dynamic macros as described above, and/or adding decoration for the final recommendation, for example, or if the subject line is suitable for an emoji in the context, adding an emoji.

Figure 5:
FIG. 5 is a block diagram illustrating an example of post processing flow for the first exemplary embodiment.
Figure 5:
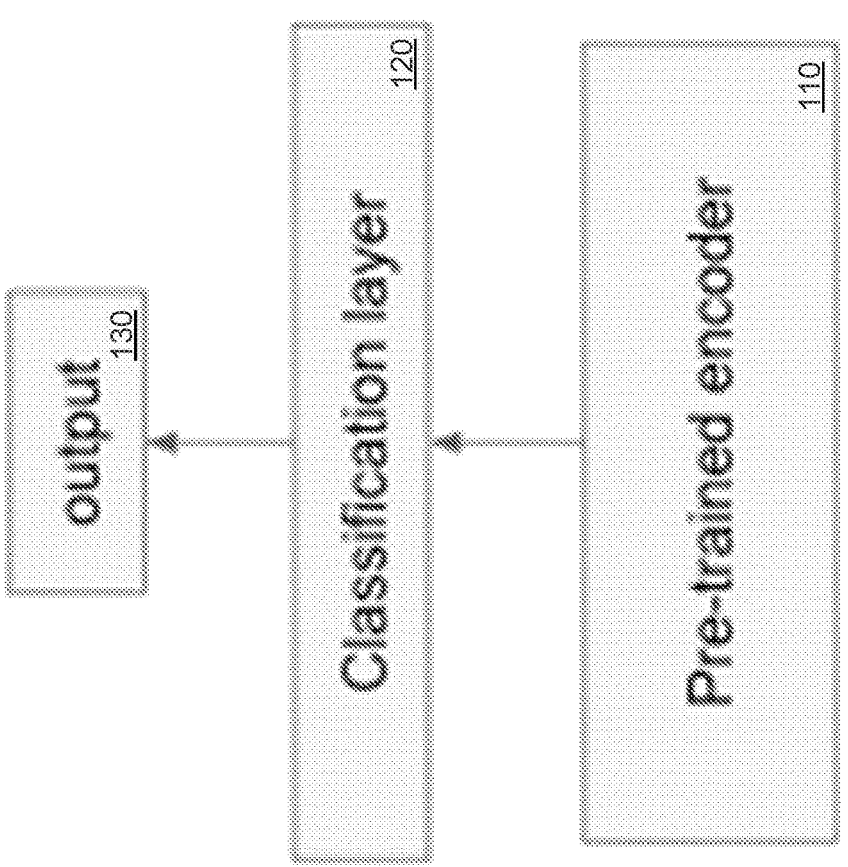

Selection of an appropriate emoji may incorporate sentiment analysis. Sentiment analysis is a general term in computational linguistics for techniques that quantify sentiment or mood in a text. The exemplary embodiments expand sentiment analysis to recommend emoji in the email subject line based on campaign content. FIG. 5 is a block diagram 100 illustrating an example of post-processing flow for the first exemplary embodiment.

Under the present embodiments, email campaigns with high open rate and click rate are selected. For those selected campaign, text and images are extracted from email campaigns and converted to text. The embodiments also extract emoji used in subject lines for those campaigns with high open rates and click rate. A dataset is constructed with input as text version of email content and output as emojis. The embodiments filter emoji vocabulary, for example to 512, to narrow down the recommendation space for better accuracy and filter out emojis not suitable for the subject line.

As shown in FIG. 4, the model includes a pre-trained encoder followed by a linear layer connected layer of classification. The output of the encoders and language embedding are each connected a node in the linear layer, for example, having a dimension of 512. As shown in FIG. 5, a classification layer 120 receives output of a pre-trained encoder 110, and the output layer 130 predicts the emoji of the given input using sentiment analysis.

Examples of dynamic macros may include insertion of the contact's full name (first and last), gender (for honorific address), and/or an event location, date, among others.

One or more subject line recommendations are provided to the customer, as shown by block 690. Examples of recommendations may include:

20% off Everything!

Hurry! 20% Off Everything! 🎉

20% off everything from 23rd October

Grab your groovy piece & save 20%

[['First name']] Do not miss out of the 20% sale!

The SLR inference model may trained based on a history of successful previous campaigns, specifically, correlating success of a campaign based on the response to the email, based on metrics such as how often contacts opened a previous campaign, and how often contacts responded to a previous campaign.

Figure 2:
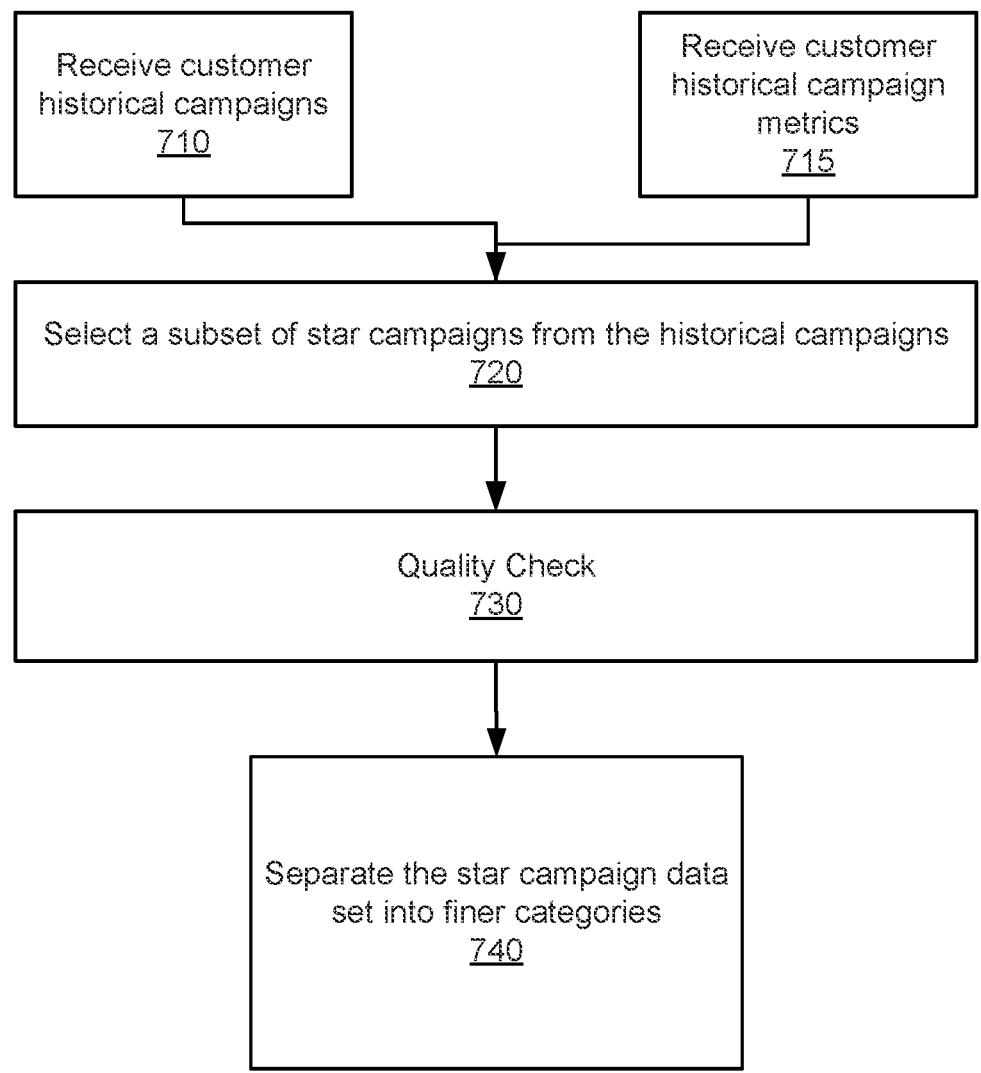
FIG. 2 is a flowchart detailing the training of a neural network for generating subject line recommendations.

FIG. 2 is a flowchart detailing the training of the T5 based model for making campaign subject line recommendations. Customer historical campaigns are received, as shown by block 710. Historical campaign metrics are received, as shown by block 715. A subset of star campaigns is selected from the historical campaigns, as shown by block 720. The star campaigns are further filtered based on a pre-defined quality, as shown by block 730. For example, the pre-defined quality may be one or more of a word count of the campaign, audience size, a metric threshold, and a content spam flag, among others. An example of a metric threshold includes an open click rate, indicating the number of times a contact opened a previous campaign. A higher click rate, for example, a top 25 percentile, is more desirable. A content spam flag may indicate the email campaign is "spammy" (not appropriately targeted) or contains phishing (suspect) links. The star campaigns data set may be separated into finer categories, as shown by block 740. For example, the customer may be divided into different vertical categories depending upon the type of business they are in. As another example, the customer may be categorized based on the size of their business.

Figure 3:
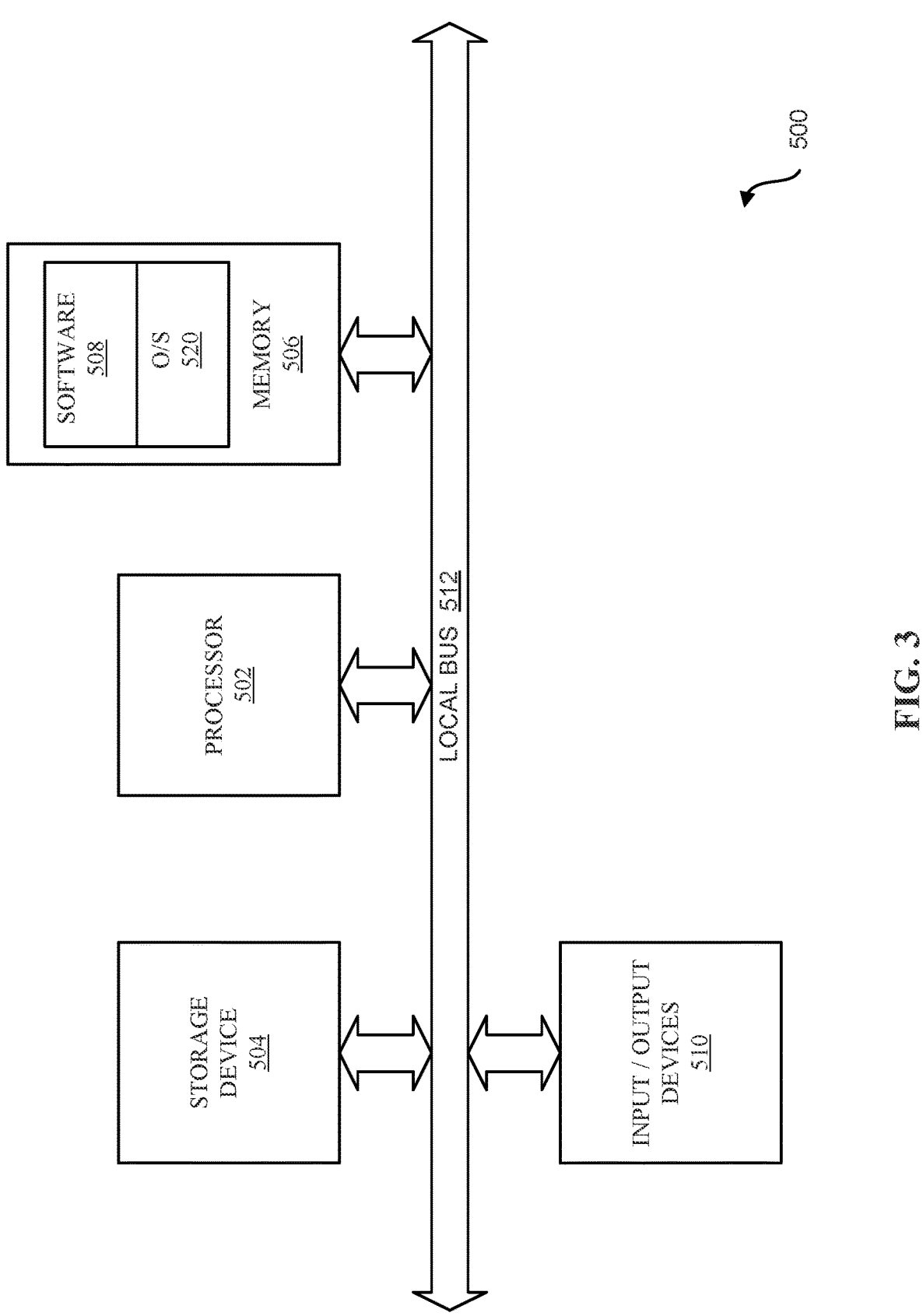
FIG. 3 is a schematic diagram illustrating an example of a system for executing functionality of the present invention.

The present system for executing the functionality described in detail above may be a computer, an example of which is shown in the schematic diagram of FIG. 3. The system 500 contains a processor 502, a storage device 504, a memory 506 having software 508 stored therein that defines the above mentioned functionality, input, and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macro processor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer based method for an electronic marketing campaign from a customer to a contact, comprising the steps of:
  receiving a campaign comprising an email message body;
  receiving a historic profile of a previous campaign by the customer, comprising emails sent to the contact;
  preprocessing the email message body based upon the campaign and the historic profile to produce campaign training data;
  training a neural network learning model with the campaign training data and a hyperparameter tuning module that selects at least one of the group consisting of an appropriate network layer size, depth, learning rate, and an optimization function;
receiving a subject line recommendation inference from the neural network; and
  performing named entity recognition on the subject line recommendation to seek entity titles and/or terms that may be specific or unique to the customer and ensure that extracted text correctly reflects and expresses the terms in the content of the subject line recommendation,
  wherein the email message body comprises text and/or image data.

2. The method of claim 1, wherein preprocessing the email message body further comprises the step of recognizing alphanumeric characters in the image data.

3. The method of claim 1, further comprising the step of comparing the subject line recommendation to the campaign.

4. The method of claim 3, further comprising the step of sanitizing the subject line recommendation.

5. The method of claim 1, further comprising the step of filtering language of the subject line recommendation.

6. The method of claim 1, further comprising the step of post-processing the subject line recommendation.

7. The method of claim 6, wherein the post-processing further comprises personalizing the subject line recommendation to identify the contact.

8. The method of claim 6, wherein the post-processing further comprises adding an emoji to the subject line recommendation.

9. The method of claim 1, wherein the email message body further comprises media data including one or more of the group consisting of audio data and video data.

10. The method of claim 1, wherein training the neural network learning model comprises the steps of:

receiving a plurality of customer historical campaigns;

receiving a metric for the plurality of customer historical campaigns;

selecting a subset of star campaigns from the plurality of historical campaigns;

further filtering the selected star campaigns based on a pre-defined quality, wherein the pre-defined quality is selected from the group consisting of a length, a metric threshold, and a content spam flag.

11. The method of claim 10, wherein selecting the subset of star campaigns from the plurality of historical campaigns is based in part on a customer vertical and/or a customer business size.

12. A non-transitory readable recording medium storing instructions that, when executed by a computer, provide a method for an electronic marketing campaign from a customer to a contact, comprising the steps of:

receiving a campaign comprising an email message body;

receiving a historic profile of a previous campaign by the customer, comprising emails sent to the contact;

preprocessing the email message body based upon the campaign and the historic profile to produce campaign training data;

training a neural network learning model with the campaign training data and a hyperparameter tuning module that selects at least one of the group consisting of an appropriate network layer size, depth, learning rate, and an optimization function;

receiving a subject line recommendation inference from the neural network; and performing named entity recognition on the subject line recommendation to seek entity titles and/or terms that may be specific or unique to the customer and ensure that extracted text correctly reflects and expresses the terms in the content of the subject line recommendation, wherein the email message body comprises text and/or image data.

13. The non-transitory readable recording medium of claim 12, wherein preprocessing the email message body further comprises the step of recognizing alphanumeric characters in the image data.

14. The non-transitory readable recording medium of claim 12, further comprising the step of comparing the subject line recommendation to the campaign and sanitizing the subject line recommendation.

15. The non-transitory readable recording medium of claim 12, further comprising the step of filtering language of the subject line recommendation.

16. The non-transitory readable recording medium of claim 12, further comprising the step of post-processing the subject line recommendation and personalizing the subject line recommendation to identify the contact.

17. The non-transitory readable recording medium of claim 16, wherein the post-processing further comprises adding an emoji to the subject line recommendation.

18. The non-transitory readable recording medium of claim 12, wherein the email message body further comprises media data including one or more of the group consisting of audio data and video data.

19. The non-transitory readable recording medium of claim 12, wherein training the neural network learning model comprises the steps of:

receiving a plurality of customer historical campaigns;

receiving a metric for the plurality of customer historical campaigns;

selecting a subset of star campaigns from the plurality of historical campaigns; and further filtering the selected star campaigns based on a pre-defined quality, wherein the pre-defined quality is selected from the group consisting of a length, a metric threshold, and a content spam flag.

* * * * *